UNITED STATES PATENT OFFICE.

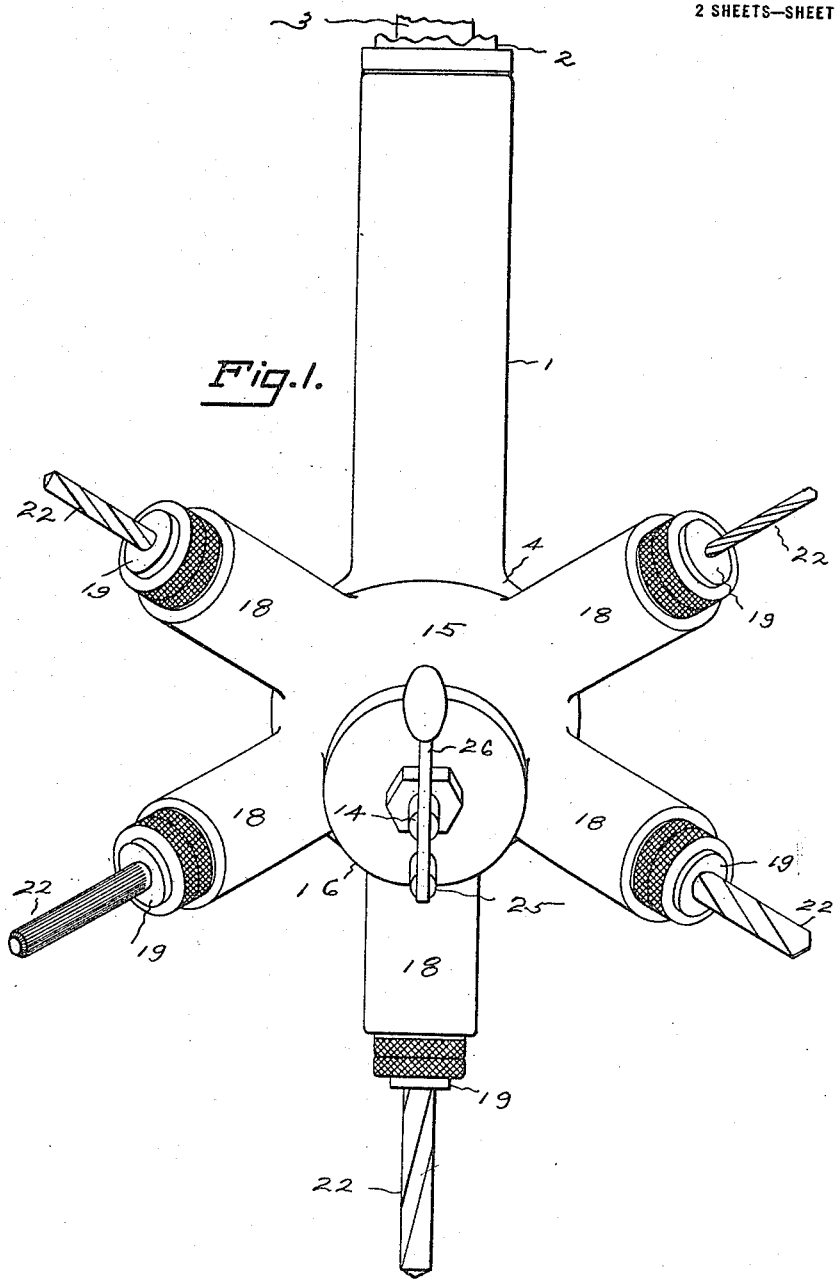

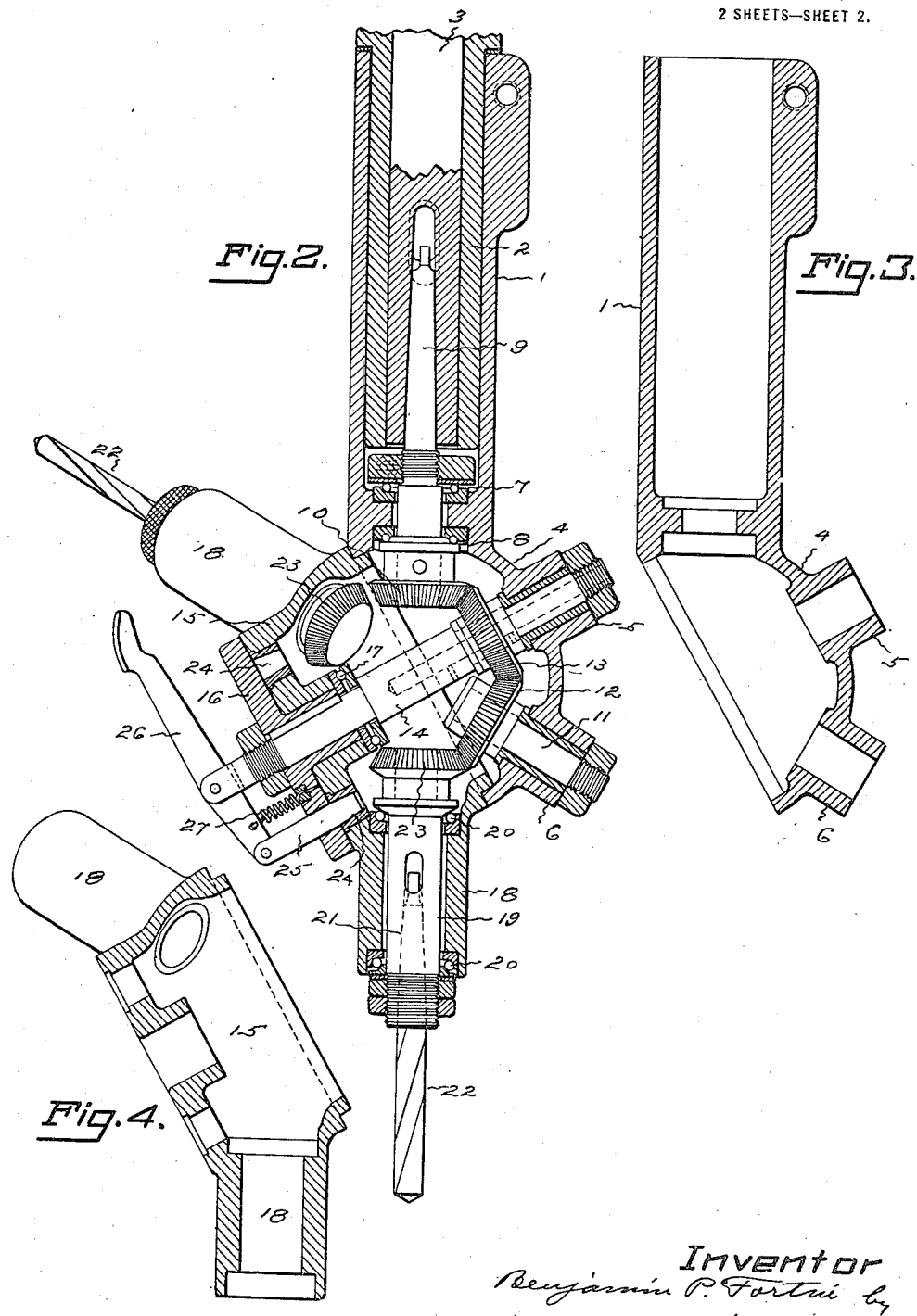

BENJAMIN P. FORTIN, OF HARTFORD, CONNECTICUT.

MULTIPLE-TOOL HEAD FOR DRILL-PRESSES.

1,283,135.  Specification of Letters Patent.  Patented Oct. 29, 1918.

Application filed July 31, 1917. Serial No. 183,795.

*To all whom it may concern:*

Be it known that I, BENJAMIN P. FORTIN, a citizen of the United States, residing at Hartford, in the county of Hartford and State of Connecticut, have invented a new and useful Improvement in Multiple-Tool Heads for Drill-Presses, of which the following is a specification.

This invention relates to the construction of a multiple tool head which is designed for ready attachment to a drill press.

The object of the invention is to provide a simple, cheap and efficient head that can be quickly attached to the supporting sleeve of a drill press with its driving stem engaged with the drill spindle of the drill press, the head carrying a number of tool holding spindles, any one of which may be instantly revolved into line with the press spindle and connected with the driving mechanism so as to be driven by the rotation of the spindle of the drill press to which the head is attached.

Figure 1 of the accompanying drawings shows a front view of a multiple tool head for a drill press which embodies this invention, having a rotatable member supporting tool spindles provided with five different tools, only one of which, that which is in line with the drill spindle, being in working position and being operatively connected with the driving gears. Fig. 2 shows a vertical section of the head attached to the sleeve of a drill press and with the driving stem of the head connected with the end of the rotatable drill spindle of the press. Fig. 3 shows a vertical section of the fixed member of the head with the driving gears omitted. Fig. 4 shows a vertical section of the movable member of the head with the tool spindles omitted.

The supporting part of the head is the sleeve 1 that is designed to be clamped upon the stationary sleeve 2 of the drill press through which the rotatable drill spindle 3 extends. Integral with this sleeve is an approximately hemispherical casing 4 having a hub 5 and a hub 6. Mounted on anti-friction bearings 7 and 8 at the lower end of the supporting sleeve is the driving stem 9, which on its lower end has a bevel gear 10. This stem is tapered and is adapted to be thrust into the usual opening in the lower end of the drill spindle. Turning on a stud 11 that is secured in the hub 6 is a bevel gear 12. Meshing with the bevel gear on the end of the driving stem and the bevel gear on the stud is a bevel gear 13 that is mounted on the post 14 which is secured in the hub 5 of the fixed casing so as to project downward at an angle with the axis of the driving stem and supporting sleeve. These bevel gears 10, 12 and 13 are always in mesh.

The dome-shaped casing 15 is mounted so as to turn freely on the post 14. One edge of this rotatable casing fits within the fixed casing with a relatively tight joint and the other edge of this rotatable casing fits with a relatively tight joint against a plate 16 that is fastened to the post 14. Anti-friction bearings 17 are provided to permit the close fitting of these parts and yet allow the free turning of the movable casing. The rotatable casing has a number of radially projecting hubs 18, each of which contains a spindle 19 mounted on anti-friction bearings 20 to permit the free rotation of the spindle. Each spindle is desirably provided with a tapering opening 21 for receiving the shank of a tool 22, which may be a drill, reamer or milling tool, and on the inner end of each of these spindles is a bevel gear 23. The outer face of the rotatable casing is provided with a number of registering openings 24, and movable through an opening in the plate 16 that is fastened to the post 14 is a pin 25 which is connected with a lever 26 that is pivoted on the end of the post. A spring 27 is arranged between the plate and the lever so as to tend to draw the pin inward. When one of the tools is turned into operative position the pin is drawn into one of the registering openings so as to lock the rotatable casing with the tool spindle in exact position. If it is desired to rotate the head for the purpose of turning another tool into operative position the lever is pushed in so as to withdraw the pin from the registering opening, and when the desired tool is turned into operative position the pin again enters a registering opening and locks the parts together. The hubs carrying the tool spindles are so located and the movable casing is connected with the fixed casing in such manner that the gear on the spindle of the tool to be used is the only one that is engaged with the driving gears, and this engagement is affected by the operation of turning the tool into operative position. The gears on the tools which are not in use are always out of engagement with the driving gears.

This head is easily attached to a drill press. With the construction shown only the tool to be used is rotated and any tool can be instantly turned into operative position by simply releasing the lock pin from the registering opening and turning the tool into line with the drill spindle and when the tool is thus turned it is automatically engaged with the driving gears and locked in that position. The construction is such that the axis of the tool which is to be used is brought into exact line with the axis of the spindle of the drill press so that the tool is operated precisely as if it were attached directly to the drill press spindle, that is, the strains incident to the resistance of the work to the feed of the tool are transmitted longitudinally to the drill press spindle the same as if the tool being used were attached directly to the drill press spindle, and consequently this permits of an easy feed and accurate cut when the tool is being driven at high speed. The casing members fit together in such manner that the parts can be easily lubricated and the lubricant kept under restraint.

The invention claimed is:

A tool head comprising a supporting sleeve, a driving stem rotatably mounted in said sleeve, a bevel gear fixed to the lower end of said stem, a casing member fixed to the lower end of said sleeve, a post supported by said casing member and extending therefrom forwardly and downwardly across the axis of the driving stem, a bevel gear turning on said post, a stud fixed to said casing member, a bevel gear turning on said stud, said bevel gears intermeshing, a plate fixed to the outer end of said post, a casing member rotatable about said post and fitting between the fixed casing member and said plate, a pin adapted to lock the rotatable casing member to said plate, a lever supported by the end of said post for withdrawing said pin from the rotatable casing member, a plurality of chuck spindles rotatably mounted in the movable casing member, and a bevel gear on the inner end of each chuck spindle, the chuck spindles being so located that the gear on the chuck spindle that is turned into line with the driving stem meshes with the driving gear train.

BENJAMIN P. FORTIN.

Copies of this patent may be obtained for five cents each, by addressing the "Commissioner of Patents, Washington, D. C."